(12) United States Patent
Mari Curbelo et al.

(10) Patent No.: US 8,047,317 B2
(45) Date of Patent: Nov. 1, 2011

(54) SYSTEM, VEHICLE, AND METHOD

(75) Inventors: A. Jorge Mari Curbelo, Unterschleissheim (DE); Henry Todd Young, North East, PA (US)

(73) Assignee: General Electric Company, Niskayuna, NY (US)

( * ) Notice: Subject to any disclaimer, the term of this patent is extended or adjusted under 35 U.S.C. 154(b) by 386 days.

(21) Appl. No.: 12/265,037

(22) Filed: Nov. 5, 2008

(65) Prior Publication Data

US 2010/0108419 A1    May 6, 2010

(51) Int. Cl.
*B60W 10/24* (2006.01)

(52) U.S. Cl. ............................ 180/65.29; 180/65.31

(58) Field of Classification Search .......... 180/165, 180/65.265, 65.285, 65.1, 65.29, 65.31; 701/22, 701/36; 363/70, 41
See application file for complete search history.

(56) References Cited

U.S. PATENT DOCUMENTS

| | | | |
|---|---|---|---|
| 5,903,449 A * | 5/1999 | Garrigan et al. | 363/41 |
| 6,486,568 B1 | 11/2002 | King et al. | |
| 6,757,597 B2 * | 6/2004 | Yakes et al. | 701/22 |
| 6,784,563 B2 | 8/2004 | Nada | |
| 6,885,920 B2 * | 4/2005 | Yakes et al. | 701/22 |
| 6,973,880 B2 | 12/2005 | Kumar | |
| 7,012,822 B2 * | 3/2006 | Zhu et al. | 363/70 |
| 7,164,977 B2 * | 1/2007 | Yakes et al. | 701/36 |
| 7,256,513 B2 * | 8/2007 | Kumar et al. | 307/9.1 |
| 7,379,797 B2 * | 5/2008 | Nasr et al. | 701/22 |
| 7,385,372 B2 * | 6/2008 | Ahmad et al. | 180/65.265 |
| 7,479,757 B2 * | 1/2009 | Ahmad | 180/165 |
| 7,568,537 B2 * | 8/2009 | King | 180/65.1 |
| 7,595,597 B2 * | 9/2009 | King et al. | 318/139 |
| 7,669,534 B2 * | 3/2010 | Kumar et al. | 105/35 |

\* cited by examiner

*Primary Examiner* — Hau Phan

(74) *Attorney, Agent, or Firm* — Joseph J. Christian

(57) ABSTRACT

A power system is provided that includes a first voltage bus, a traction motor configured to generate electrical power during a regenerative braking mode and to supply the generated electrical power to the first voltage bus, and an auxiliary system coupled to the first voltage bus. The auxiliary system comprises a second voltage bus and a power interface unit coupling the first voltage bus to the second voltage bus. The auxiliary system also comprises an energy storage device coupled to the second voltage bus and configured to store energy supplied to the second voltage bus and configured to supply stored energy to the second voltage bus and an auxiliary load configured to receive power based on power in the second voltage bus.

14 Claims, 3 Drawing Sheets

US 8,047,317 B2

SYSTEM, VEHICLE, AND METHOD

BACKGROUND

1. Technical Field

The invention includes embodiments that relate to a power system. The invention includes embodiments that relate to a vehicle. The invention includes embodiments that relate to a method of controlling a power in the vehicle.

2. Discussion of Art

It may be desirable to have a system that has aspects and features that differ from those systems that are currently available. It may be desirable to have a method that differs from those methods that are currently available.

BRIEF DESCRIPTION

Aspects of the invention provide a power system comprising a first voltage bus, a traction motor configured to generate electrical power during a regenerative braking mode and to supply the generated electrical power to the first voltage bus, and an auxiliary system coupled to the first voltage bus. The auxiliary system comprises a second voltage bus and a power interface unit coupling the first voltage bus to the second voltage bus, wherein the power interface unit is configured to receive the generated electrical power from the first voltage bus and to convert at least ten percent of the generated electrical power into non-electrical energy. The auxiliary system also comprises an energy storage device coupled to the second voltage bus and configured to store energy supplied to the second voltage bus and configured to supply stored energy to the second voltage bus and an auxiliary load configured to receive power based on power in the second voltage bus.

Aspects of the invention provide a vehicle comprising a main power bus, an engine coupled to the main power bus and configured to generate and supply power to the main power bus, and a plurality of traction motors coupled to the main power bus and configured to receive electrical power from the main power bus generated by the engine and configured to generate and supply power to the main power bus during a regenerative braking mode. The vehicle also comprises an auxiliary power bus and a power interface unit coupled between the main power bus and the auxiliary power bus, the power interface unit configured to transfer less than ninety percent of power from the main power bus to the auxiliary power bus. Further, the vehicle comprises an auxiliary load coupled to the auxiliary power bus and an energy storage device coupled to the auxiliary power bus and configured to store electrical power from the auxiliary power bus transferred by the power interface unit and configured to supply power to the auxiliary power bus to power the auxiliary load.

Aspects of the invention provide a method comprising coupling an auxiliary power bus of an off-highway vehicle to a main power bus of the off-highway vehicle via a power interface unit configured to deliver less than ninety percent of the power transferred through the power interface unit from the main power bus to the auxiliary power bus, coupling a battery pack to the auxiliary power bus, and coupling an auxiliary load to the auxiliary power bus. The method also comprises charging the battery pack during a regenerative braking mode of the off-highway vehicle and supplying power from the battery pack to the auxiliary power bus during a non-regenerative braking mode of the off-highway vehicle to power the auxiliary load.

Various other features may be apparent from the following detailed description and the drawings.

DETAILED DESCRIPTION

Figure 1:
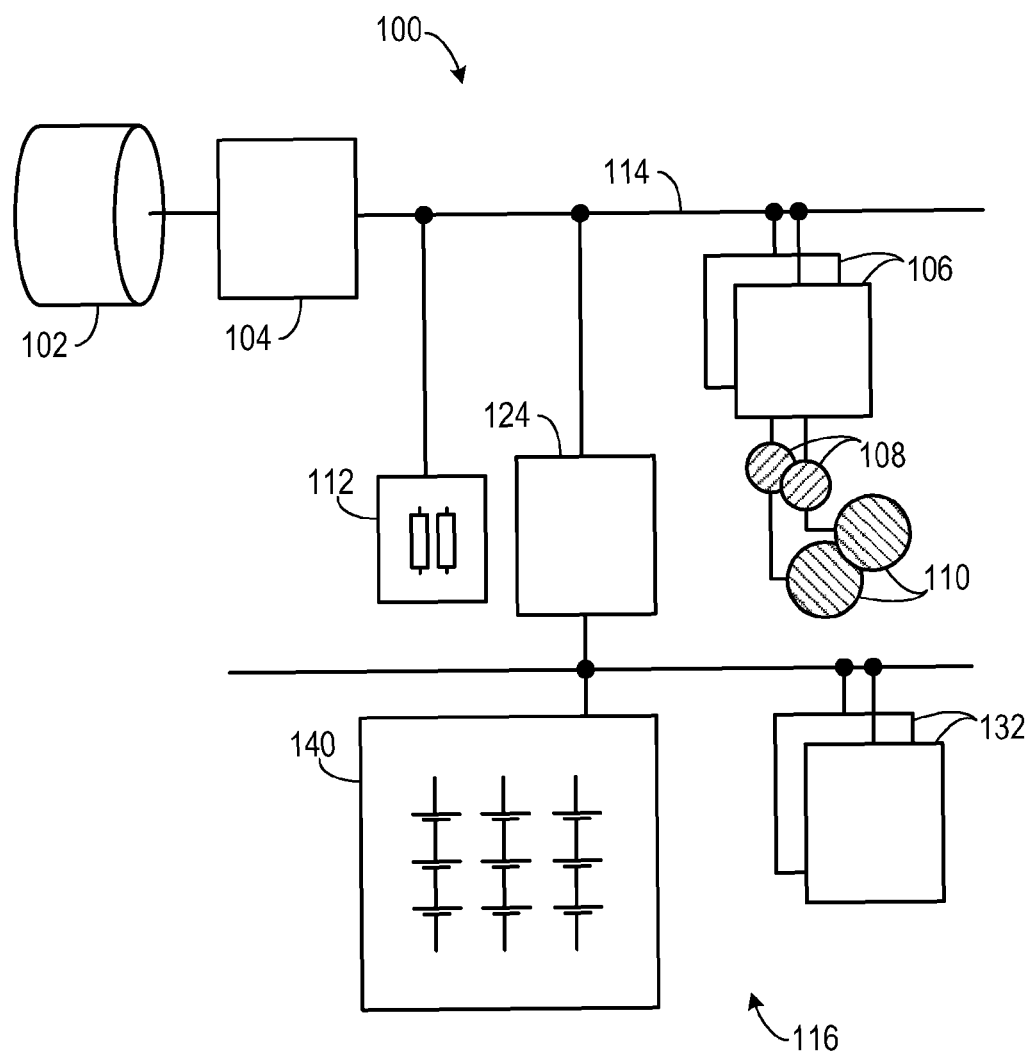
FIG. 1 is a block diagram of an exemplary off-highway vehicle according to an embodiment of the invention.

The invention includes embodiments that relate to electromotive traction systems. The invention includes embodiments that relate to an apparatus for controlling an auxiliary load in a vehicle. The invention includes embodiments that relate to a method of controlling an auxiliary load in a vehicle.

Embodiments of the invention provide a power system comprising a first voltage bus, a traction motor configured to generate electrical power during a regenerative braking mode and to supply the generated electrical power to the first voltage bus, and an auxiliary system coupled to the first voltage bus. The auxiliary system includes a second voltage bus and a power interface unit coupling the first voltage bus to the second voltage bus. The power interface unit can receive the generated electrical power from the first voltage bus and to convert at least ten percent of the generated electrical power into non-electrical energy. The auxiliary system also includes an energy storage device coupled to the second voltage bus and configured to store energy supplied to the second voltage bus and configured to supply stored energy to the second voltage bus and an auxiliary load configured to receive power based on power in the second voltage bus.

Embodiments of the invention provide a vehicle comprising a main power bus, an engine coupled to the main power bus and configured to generate and supply power to the main power bus, and a plurality of traction motors coupled to the main power bus and configured to receive electrical power from the main power bus generated by the engine and configured to generate and supply power to the main power bus during a regenerative braking mode. The vehicle also includes an auxiliary power bus and a power interface unit coupled between the main power bus and the auxiliary power bus, the power interface unit configured to transfer less than ninety percent of power from the main power bus to the auxiliary power bus. Further, the vehicle includes an auxiliary load coupled to the auxiliary power bus and an energy storage device coupled to the auxiliary power bus and configured to store electrical power from the auxiliary power bus transferred by the power interface unit and configured to supply power to the auxiliary power bus to power the auxiliary load.

Embodiments of the invention provide a method comprising coupling an auxiliary power bus of an off-highway vehicle to a main power bus of the off-highway vehicle via a power interface unit configured to deliver less than ninety percent of the power transferred through the power interface unit from the main power bus to the auxiliary power bus, coupling a battery pack to the auxiliary power bus, and coupling an auxiliary load to the auxiliary power bus. The method also includes charging the battery pack during a regenerative braking mode of the off-highway vehicle and supplying power from the battery pack to the auxiliary power bus during a non-regenerative braking mode of the off-highway vehicle to power the auxiliary load.

FIG. 1 is a block diagram of an exemplary off-highway vehicle (OHV) 100 according to an embodiment of the invention. FIG. 1 reflects a diesel-electric OHV. Suitable other vehicles may include locomotives, mining trucks, underground vehicles, and excavators. Alternative embodiments may include marine vessels. The mining trucks and excavators may have more than a 100-ton capacity. OHVs can have a power weight ratio of less than 10 horsepower per ton with a ratio of 5 horsepower per ton being common. An OHV may use dynamic or electric braking.

As illustrated in FIG. 1, the OHV 100 includes a diesel engine 102 driving an alternator/rectifier 104. The alternator/rectifier 104 provides DC electric power to one or more inverters 106 that converts the AC electric power to a form suitable for use by a traction motor 108. One OHV configuration includes one or more inverter/traction motors per wheel 110, with two wheels forming the equivalent of an axle (not shown). Such a configuration may result in four or more inverters 106 per OHV 100. FIG. 1 illustrates a pair of inverters 106, a pair of traction motors 108, and a pair of wheels 110 for convenience. By way of example, large excavation dump trucks may employ motorized wheels such as the GEB23™ AC motorized wheel employing the GE150AC™ drive system (both of which are available from GE Transportation (Erie, Pa.)).

An inverter converts DC power to AC power. A rectifier converts AC power to DC power. The term "converter" may be used to refer to inverters and rectifiers. The electrical power supplied in this manner may be referred to as prime mover power (or primary electric power) and the alternator/rectifier 104 may be referred to as a source of prime mover power. In one AC diesel-electric OHV application, the AC electric power from the alternator is first rectified (converted to DC). The rectified AC is inverted (e.g., using solid state power electronics such as insulated gate bipolar transistors (IGBTs) or thyristors operating as pulse-width modulators to provide a suitable form of AC power for the respective traction motor 108.

The traction motors 108 provide the tractive power to move the OHV 100 and any other vehicles, such as load vehicles, attached to the OHV 100. Such traction motors 108 may be AC or DC electric motors. When using DC traction motors, the output of the alternator 104 can be rectified to provide appropriate DC power. When using AC traction motors, the alternator output can be rectified to DC and inverted to AC before being supplied to the traction motors 108.

The traction motors 108 may provide a braking force for controlling speed or for slowing and/or stopping the motion of the OHV 100. This is referred to as dynamic braking. When a traction motor 108 is not needed to provide motive force, it can be reconfigured (via power switching devices) so that the motor operates as an electric power generator. So configured, the traction motor 108 generates electric energy, which has the effect of slowing the OHV 100. The electrical energy generated in the dynamic braking mode can be transferred to a resistance grid box 112 mounted on the vehicle housing.

As shown, the diesel engine 102 is coupled to the alternator 104. Together, they constitute a primary source of electrical energy and are connected to a primary or main power bus 114. The main power bus 114 provides power to the traction motor 108 for vehicle propulsion. The combination of the traction motor 108 and the inverter 106 constitutes a secondary source of electrical energy in a regenerative braking mode. When reconfigured as an electric power generator as described above, the traction motor/inverter power source provides power to the main power bus 114. The configuration of the main power bus 114 to be connected to either the primary or secondary source of electrical energy allows for the capture and storage of a portion of the energy generated by the traction motor 108 to hybridize an auxiliary system 116 that includes a power interface unit (PIU) 124, one or more auxiliary loads or subsystems 132, and an energy storage device 140.

Figure 2:
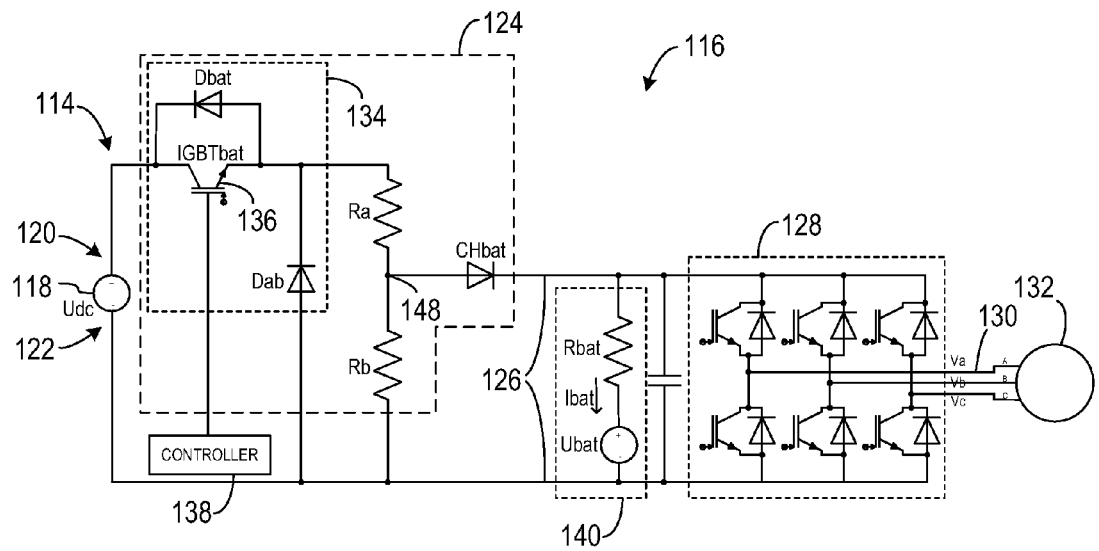
FIG. 2 is a schematic diagram of an exemplary hybrid scheme according to an embodiment of the invention.

FIG. 2 shows a schematic diagram of an exemplary hybrid scheme of the auxiliary system 116 according to an embodiment of the invention. An energy source 118 represents either the primary or secondary sources of electrical energy resulting from the diesel engine/alternator combination or from the traction motor/inverter combination discussed above with respect to FIG. 1. The diesel engine/alternator combination may provide the source of energy during a self-load testing mode of operation in which the traction motors are not operated to allow testing of the OHV 100 without moving it. Alternatively, the traction motor/inverter combination may provide the source of energy during a regenerative braking mode.

The main power bus 114 is coupled to the source 118 and is a DC power or voltage bus. The main power bus 114 includes a power supply side 120 and a power return side 122. PIU 124 is coupled between the main power bus 114 and an auxiliary voltage or power bus 126. An inverter 128 is coupled to the auxiliary power bus 126 and converts DC power on the auxiliary power bus 126 into AC power. The AC power is coupled to an AC auxiliary load bus 130 for delivery to one or more auxiliary loads or subsystems 132. Suitable auxiliary loads 132 include, for example, lighting, air conditioning/heating, blower drives, radiator fan drives, control battery chargers, field exciters, power steering, pumps, hoists, and the like. In particular, the auxiliary load 132 may be one or more inverter-driven fans to cover the cooling needs in the OHV 100. The fan provides convective cooling to components such as the diesel engine 102, the alternator/rectifier 104, the inverters 106, the traction motors 108, and the grid box 112 shown in FIG. 1.

Industrial standards for auxiliary loads such as those described above may call for powering such auxiliary loads from a 400V/50 Hz or 480V/60 Hz AC power bus. In contrast, voltages on the main power bus 114 may be as high as 1500V DC, or higher. According to an embodiment of the invention, the auxiliary power bus 126 is a 600V DC or more power bus from which the inverter 128 inverts voltage or power into the 400V/50 Hz or 480V/60 Hz AC power as needed.

To convert the power on the main power bus 114 to the desired power on the auxiliary power bus 126, the PIU 124 is coupled therebetween. Resistors Ra and Rb provide a voltage divisor configured to step the voltage down from the main power bus 114 to the auxiliary power bus 126. Resistors Ra and Rb are sized to allow more than ten percent of the power flowing through Ra to be converted into non-electrical energy such as heat. A chopper module 134 includes a switch 136, such as insulated gate bipolar transistor, IGBTbat, is controlled by a controller 138 to control the supply of energy from the main power bus 114 through resistors Ra and Rb. The chopper module 134 also includes a diode, Dab, offers a free-wheel path for resistors Ra and Rb when the switch 136 opens.

Energy storage device 140 is coupled to the auxiliary power bus 126 to store energy supplied to the auxiliary power bus 126 through the PIU 124 and to supply energy to the auxiliary power bus 126 and the inverter 128 when no energy is supplied to the auxiliary power bus 126 through the PIU 124. According to an embodiment of the invention, the energy storage device 140 is a battery pack. A suitable battery pack may include one or more energy batteries, and, optionally, one or more power batteries. A suitable energy battery may be a sodium metal hydride battery, and a suitable power battery may be a lithium ion battery. One or more capacitors may be electrically coupled to the energy storage device to reduce cycling, provide instant power, and extend the life of the battery pack. Resistor Ra may be sized to limit the current flowing into the energy storage device 140 according to the device characteristics of the energy storage device 140. A diode, CHbat, is coupled to a node 148 between resistors Ra and Rb and impedes battery discharge through Rb.

The controller 138, in one embodiment, closes the switch 136 during the regenerative braking mode of the traction motor/inverter combination of FIG. 1. In this manner, the energy storage device 140 is allowed to charge from a portion of the excess energy generated by the traction motor/inverter combination when OHV 100 is braking. The energy storage device 140 can be sized to supply all the energy needed for the auxiliary loads 132 and to store that energy during the periods of braking the OHV 100. Additionally, the hybridized auxiliary system 116 may be tested during a self-load test of the OHV 100 where the energy storage device 140 is tested for its energy storage/supply functions without engaging traction motor 108. Accordingly, the controller 138 can close the switch 136 during the self-load test mode. Furthermore, the controller 138 may control the open and close states of the switch 136 during energy generation via the primary source of electrical energy if it is determined that the energy storage device 140 is not working properly such that the auxiliary loads 132 may function until the OHV 100 is serviced or repaired.

The controller 138 may be also configured to the control switch 136 to control a soft-cycle recharging of the energy storage device 140. For example, in one embodiment, a range of from about 40% to about 70% state-of-charge (SOC) of the energy storage device 140 is maintained because of current/voltage operating schemes. Such schemes may include fast charging available below 70% SOC. Soft-cycle recharging of the energy storage device 140 allows the controller 138 to decide whether or not to close the switch 136. The controller 138 may keep the switch 136 open when there is enough energy stored to maintain operation of the auxiliary loads 132 until a next regenerative braking mode. In this manner, soft-cycle control may extend the life of the energy storage device 140.

The current, Ibat, flowing into the energy storage device 140 may be found from the following equation:

$$I_{bat} = \frac{U_{dc} - U_{bat}(I_{bat})(1 + R_a/R_b)}{R_a} - I_{conv}, \quad \text{(Eqn. 1)}$$

provided that the first term, $(U_{dc}-U_{bat}(I_{bat})(1+R_a/R_b))/R_a$, is positive. Otherwise, diode, CHbat, blocks current flowing in the opposite direction, and Eqn. 1 reduces to:

$$I_{bat} = -I_{conv} \quad \text{(Eqn. 2)}.$$

Eqn. 1 allows for two degrees of freedom: the value of Ra and the quotient of Ra/Rb. Proper selection of these two degrees of freedom ensures that current and power limits of the energy storage device 140 are respected across the SOC interval.

Figure 3:
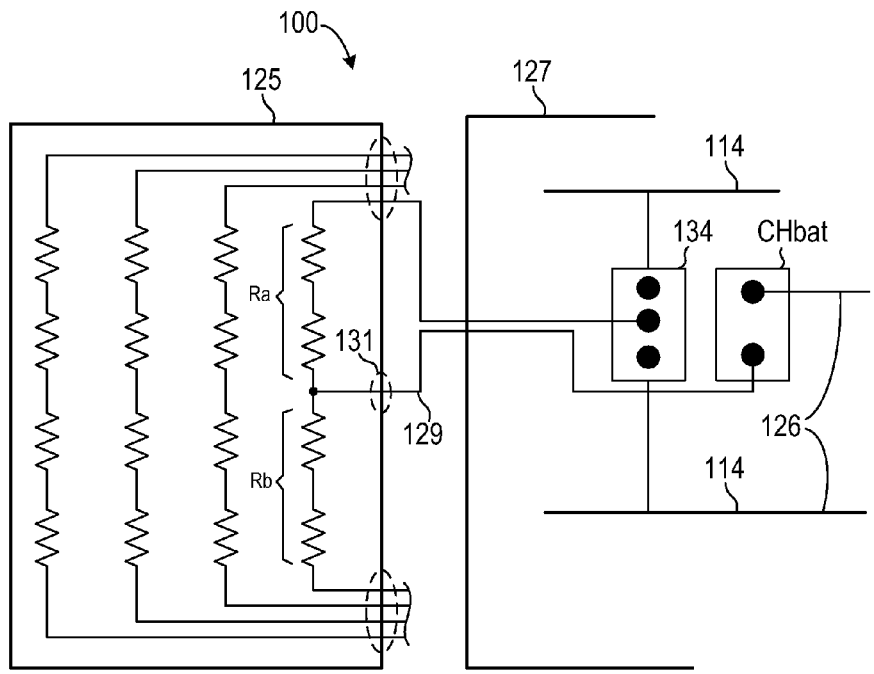
FIG. 3 is a schematic diagram of a portion of the power interface unit of FIG. 2 coupled to a grid box according to an embodiment of the invention.

FIG. 3 shows a schematic diagram of a portion of the PIU 124 of FIG. 2 coupled to a grid box 125 according to an embodiment of the invention. Referring to FIGS. 2 and 3, the chopper module 134, which may be positioned in a power electronics cabinet 127, is coupled to the main power bus 114 and to one end of resistor Ra. The node 148 between resistors Ra and Rb in grid box 125 is coupled via a cable 129 to one end of the diode, CHbat, which has the other end coupled to auxiliary power bus 126.

It is contemplated that grid box 125 may be newly designed based on embodiments of the invention described herein. Alternatively, grid box 125 may be an existing grid box that is retrofit and used to hybridize the auxiliary system of OHV 100. Accordingly, an orifice 131 may be formed in grid box 125 to route the cable 129 therethrough. In this manner, it is contemplated that retrofitting a grid box 125 in an existing OHV 100 may be accomplished with minor modifications thereto.

Figure 4:
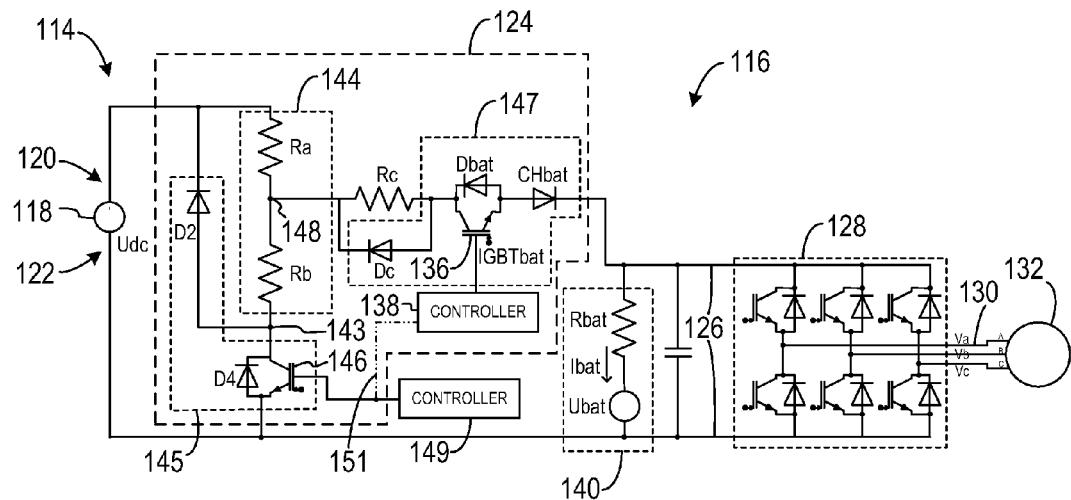
FIG. 4 is a schematic diagram of an exemplary hybrid scheme according to another embodiment of the invention.

FIG. 4 shows a schematic diagram of an exemplary hybrid scheme of the auxiliary system 116 according to an embodiment of the invention. The PIU 124 incorporates an existing main braking string 144 of the grid box 112 shown in FIG. 1. A switch 146 is coupled to the main braking string 144 via a node 143 and, when closed, allows current to flow through resistors Ra and Rb. A controller 149 is coupled to the switch 146 and controls the opened and closed states of the switch 146. A diode, D2, is also coupled to the main braking string 144 via the node 143 and provides a free-wheel path for resistors Ra and Rb when the switch 146 opens. The PIU 142 may include a resistor Rc connected to a node 148 between resistors Ra and Rb when a current rating of the energy storage device 140 is not in the same order as the braking current. Resistor Rc is also connected to a module 147 that includes the switch 136 and three diodes: Dc, Dbat, and CHbat. The switch 136 may be opened or closed by the controller 138 to allow energy from the node 148 to be captured and stored in the energy storage device 140.

In an embodiment of the invention, the controllers 138, 149 receive system and operating state information from the OHV (not shown) and work together to open or close switches 136, 146 during a braking or non-braking operation of the OHV as necessary. In another embodiment of the invention, controller 138 controls both switches 136, 146 illustrated by phantom line 151. In this embodiment, controller 149 may be disconnected from switch 146 and removed from the overall system or used for controlling other components.

The current, Ibat, flowing into the energy storage device 140 may be found from the following equation:

$$I_{bat} = \frac{U_{dc} - U_{bat}(I_{bat})(1 + R_a/R_b)}{R_a + (1 + R_a/R_b)R_c} - I_{conv}, \quad \text{(Eqn. 3)}$$

provided that the first term, $(U_{dc}-U_{bat}(I_{bat})(1+R_a/R_b))/(R_a+(1+R_a/R_b)R_c)$, is positive. Otherwise, diode, CHbat, blocks current flowing in the opposite direction, and Eqn. 3 reduces to:

$$I_{bat} = =I_{conv} \quad \text{(Eqn. 4)}.$$

Eqn. 3 allows for two degrees of freedom: the value of Rc and the quotient of Ra/Rb since the value Ra+Rb is approximately given by the braking power needed in the pre-existing braking string 144. Proper selection of these two degrees of freedom ensures that current and power limits of the energy storage device 140 are respected across the SOC interval.

Figure 5:
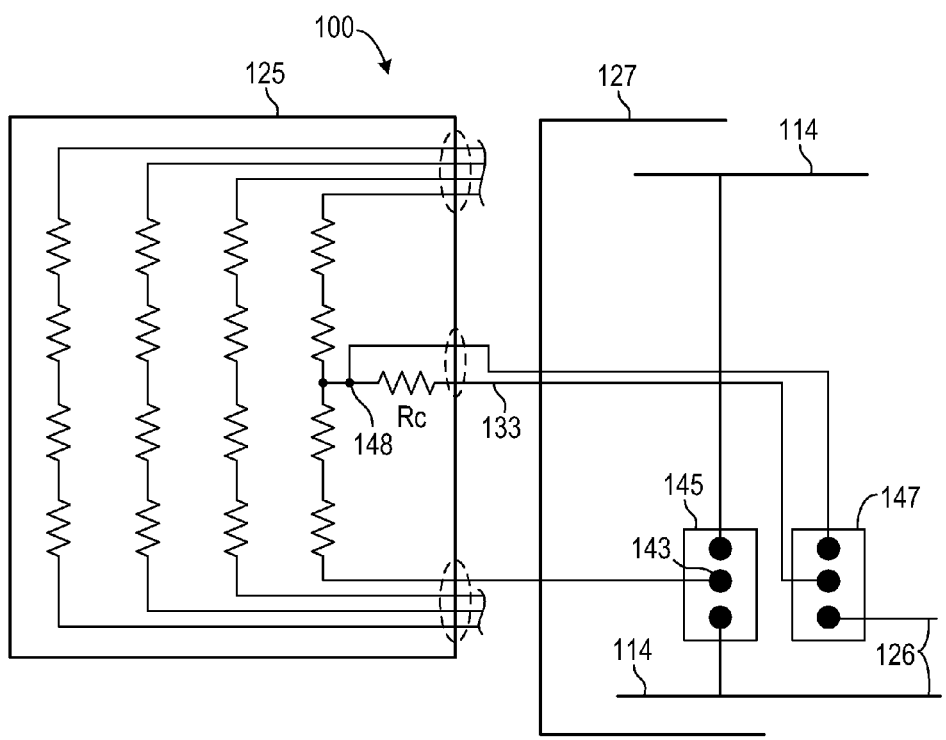
FIG. 5 is a schematic diagram of a portion of the power interface unit of FIG. 4 coupled to a grid box according to an embodiment of the invention.

FIG. 5 shows a schematic diagram of a portion of the PIU 124 of FIG. 4 coupled to a grid box 125 according to an embodiment of the invention. Referring to FIGS. 4 and 5, a module 145, which includes the switch 146 and the diode D2, is positioned in a power electronics cabinet 127 and is coupled between the main power bus 114 and to one end of resistor Rb at the node 143. The resistor Rc is coupled to the module 147 through the node 148 and to the module 147 through a cable 133.

Implementation of embodiments of the invention may allow for the elimination of bulky step up/down choppers or buck converters to convert energy in the main power bus to the auxiliary power bus. Implementation of embodiments of the invention may allow for a reduction in diesel fuel consumption during idling periods when the traction motors are not engaged for motive force since auxiliary energy is generated by the energy storage device rather than the main diesel engine. Embodiments of the invention may be seamlessly integrated into existing OHVs for hybridization of their auxiliary power system.

The invention has been described in terms of the preferred embodiment, and it is recognized that equivalents, alternatives, and modifications, aside from those expressly stated, are possible and within the scope of the appending claims.

What is claimed is:

1. A power system, comprising:
   a first voltage bus;
   a traction motor configured to generate electrical power during a regenerative braking mode and to supply the generated electrical power to the first voltage bus;
   an auxiliary system coupled to the first voltage bus, the auxiliary system comprising:
     a second voltage bus;
     a power interface unit coupling the first voltage bus to the second voltage bus, wherein a power extraction point to the second voltage bus follows a diode connected to an intermediate point of a resistor chain, further wherein the power interface unit is configured to receive the generated electrical power from the first voltage bus and to convert at least ten percent of the generated electrical power into non-electrical energy;
     an energy storage device coupled to the second voltage bus and configured to store energy supplied to the second voltage bus and configured to supply stored energy to the second voltage bus; and
     an auxiliary load configured to receive power based on power in the second voltage bus.

2. The power system of claim 1, wherein the power interface unit comprises a resistor string coupled to a power supply side of the first voltage bus and coupled to a power return side of the first voltage bus.

3. The power system of claim 2, wherein the power interface unit further comprises a switch configured to control a supply of the generated electrical power from the first voltage bus to the second voltage bus.

4. The power system of claim 3, wherein the switch is an insulated-gate bipolar transistor.

5. The power system of claim 3, wherein the power interface unit further comprises a resistor configured to limit current flowing through the power interface unit to match a current rating of the energy storage device with the current supplied thereto.

6. The power system of claim 3, wherein the power interface unit further comprises a diode configured to impede discharge of the energy storage device through the power interface unit.

7. The power system of claim 1, wherein the first and second voltage busses are DC voltage busses.

8. The power system of claim 7, further comprising an inverter coupled between the second DC voltage bus and the auxiliary load and configured to invert DC power from the second voltage bus into AC power.

9. The power system of claim 1, wherein the auxiliary load powers a cooling fan.

10. The power system of claim 1, wherein the energy storage device comprises both an energy battery and a power battery.

11. The power system of claim 1, further comprising a main alternator coupled to the first voltage bus and configured to operate in a self-load mode of operation during a self-load test of the auxiliary system.

12. A method, comprising:
    coupling an auxiliary power bus of an off-highway vehicle to a main power bus of the off-highway vehicle via a power interface unit configured to deliver less than ninety percent of the power transferred through the power interface unit from the main power bus to the auxiliary power bus;
    coupling a battery pack to the auxiliary power bus;
    coupling an auxiliary load to the auxiliary power bus;
    charging the battery pack during a regenerative braking mode of the off-highway vehicle; and
    supplying power from the battery pack to the auxiliary power bus during a non-regenerative braking mode of the off-highway vehicle to power the auxiliary load.

13. The method of claim 12, further comprising coupling an inverter between the auxiliary load and the auxiliary power bus, the inverter configured to invert DC power from the second voltage bus into AC power.

14. The method of claim 12, further comprising:
    providing the power interface unit with a voltage divider circuit comprising a plurality of resistors placed in series between a power supply side of the main power bus and a power return side of the main power bus, wherein the plurality of resistors comprises a node positioned therebetween such that more than ten percent of power from the main power bus is converted into non-electrical energy between the main power bus and the node; and
    coupling the node to the auxiliary power bus.

* * * * *